United States Patent
Lantz et al.

(10) Patent No.: US 12,555,599 B2
(45) Date of Patent: Feb. 17, 2026

(54) FOLDED SPRING TAPE TRACK FOLLOWING ACTUATOR

(71) Applicant: INTERNATIONAL BUSINESS MACHINES CORPORATION, Armonk, NY (US)

(72) Inventors: Mark Alfred Lantz, Adliswil (CH); Walter Haeberle, Waedenswil (CH); Simeon Furrer, Altdorf (CH); David Harper, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 18/524,061

(22) Filed: Nov. 30, 2023

(65) Prior Publication Data
US 2025/0182785 A1    Jun. 5, 2025

(51) Int. Cl.
| G11B 5/584 | (2006.01) |
| G11B 5/008 | (2006.01) |
| G11B 5/48 | (2006.01) |
| G11B 5/55 | (2006.01) |
| G11B 21/24 | (2006.01) |

(52) U.S. Cl.
CPC .......... *G11B 5/584* (2013.01); *G11B 5/00813* (2013.01); *G11B 5/4893* (2013.01); *G11B 5/5504* (2013.01); *G11B 21/24* (2013.01)

(58) Field of Classification Search
None
See application file for complete search history.

(56) References Cited

U.S. PATENT DOCUMENTS

| 4,203,606 A | 5/1980 | Obata et al. |
| 4,716,483 A | 12/1987 | Walsh |
| 4,870,518 A | 9/1989 | Thompson et al. |
| 5,270,887 A | 12/1993 | Edwards et al. |
| 5,379,170 A | 1/1995 | Schwarz |
| 5,450,257 A | 9/1995 | Tran et al. |
| 5,508,865 A | 4/1996 | La Garcia et al. |
| 5,638,237 A | 6/1997 | Phipps et al. |
| 5,726,834 A | 3/1998 | Eckberg et al. |
| 6,075,678 A | 6/2000 | Saliba |

(Continued)

FOREIGN PATENT DOCUMENTS

| EP | 0364263 A2 | 4/1990 |
| WO | 2003/105133 A1 | 12/2003 |

OTHER PUBLICATIONS

Boettcher et al., "Dynamic Modeling and Control of a Piezo-Electric Dual-Stage Tape Servo Actuator," IEEE Transactions on Magnetics, vol. 45, No. 7, Jul. 2009, https://web.eng.ucsd.edu/mae/groups/callafon/research/publications/2009/IEEETonM1.pdf, pp. 3017-3024.

(Continued)

*Primary Examiner* — Craig A. Renner
(74) *Attorney, Agent, or Firm* — Tihon Poltavets

(57) ABSTRACT

An apparatus for a spring actuator positioned in a folded spring actuator assembly includes a top section, a middle section, and a bottom section of the spring actuator that form a C-shape for the spring actuator. The middle section includes two parallelized spring legs, where a cable head module is slidable into a gap formed by the top section and two parallelized spring legs of the middle section of the spring actuator.

18 Claims, 9 Drawing Sheets

(56) References Cited

U.S. PATENT DOCUMENTS

| | | | |
|---|---|---|---|
| 7,342,738 | B1 | 3/2008 | Anderson et al. |
| 7,459,835 | B1 | 12/2008 | Mei et al. |
| 8,154,811 | B2 | 4/2012 | Barsotti et al. |
| 8,184,394 | B2 | 5/2012 | Poorman et al. |
| 11,894,030 | B2 | 2/2024 | Biskeborn |
| 11,935,563 | B2 | 3/2024 | Noda et al. |
| 11,990,154 | B1 | 5/2024 | Sakagami et al. |
| 11,990,164 | B1 | 5/2024 | Kuroki et al. |
| 12,266,387 | B1 | 4/2025 | Lantz et al. |
| 2001/0015866 | A1 | 8/2001 | Nakagawa |
| 2002/0122268 | A1 | 9/2002 | Bement et al. |
| 2003/0202291 | A1 | 10/2003 | Pan et al. |
| 2004/0123448 | A1 | 7/2004 | Nguyen et al. |
| 2004/0184195 | A1 | 9/2004 | Nayak et al. |
| 2004/0212916 | A1 | 10/2004 | Nakao et al. |
| 2005/0081368 | A1 | 4/2005 | Yao et al. |
| 2005/0099736 | A1 | 5/2005 | Utsunomiya |
| 2005/0219756 | A1 | 10/2005 | Dugas et al. |
| 2006/0098331 | A1 | 5/2006 | McCormack et al. |
| 2007/0053110 | A1 | 3/2007 | Harper |
| 2007/0165444 | A1 | 7/2007 | Culver et al. |
| 2012/0206832 | A1 | 8/2012 | Hamidi et al. |
| 2014/0133053 | A1 | 5/2014 | Liu et al. |
| 2015/0248915 | A1* | 9/2015 | Haeberle et al. ...... G11B 21/24 360/241.3 |
| 2017/0076746 | A1* | 3/2017 | Harper et al. ......... G11B 5/584 |
| 2017/0092312 | A1* | 3/2017 | Harper ................... G11B 5/584 |
| 2020/0258544 | A1 | 8/2020 | Kobayashi |

OTHER PUBLICATIONS

Raeymaekers et al., "Design of a dual stage actuator tape head with high-bandwidth track following capability," Microsyst Technol (2009) 15: pp. 1525-1529, Published: Feb. 19, 2009, https://link.springer.com/article/10.1007/s00542-009-0800-y.

United States Non-Final Rejection dated Sep. 6, 2024, 9 pages, U.S. Appl. No. 18/524,046.

United States Notice of Allowance dated Jan. 31, 2025, 7 pages, in U.S. Appl. No. 18/524,046.

* cited by examiner

FOLDED SPRING TAPE TRACK FOLLOWING ACTUATOR

BACKGROUND

This disclosure relates generally to tape drives, and in particular, to a folded spring tape track following actuator for tape drives.

A tape drive is a data storage device that reads and writes data on a magnetic tape. The areal density and capacity gains in recent generations of tape drives have been primarily achieved through track density scaling and the trend is set to continue for future generations of tape drives. The performance of the track following servo system and the tape dimensional stability (TDS) servo system are key to enabling track density scaling. A performance of the track following servo system and the TDS servo system is constrained by a performance of a skew actuator, which is a central component in future skew-based TDS compensation schemes. An improvement to servo system performance includes reducing a moving mass of the actuator and/or increasing a stiffness of the actuator relative to flexible modes (i.e., higher order resonant modes).

SUMMARY

One aspect of an embodiment of the present invention discloses an apparatus for a spring actuator, the apparatus comprising a top section, a middle section, and a bottom section of the spring actuator form a C-shape for the spring actuator. The apparatus further comprising: the middle section includes two parallelized spring legs, wherein a cable head module is slidable into a gap formed by the top section and two parallelized spring legs of the middle section of the spring actuator.

Another aspect of an embodiment of the present discloses the apparatus further including a first bend between the top section and the middle section, a second bend between bottom section and the middle section, wherein the first bend and the second bend form the C-shape for the spring actuator.

Another aspect of an embodiment of the present discloses the apparatus further including a first set of middle stiffener wings of a first spring leg of the two parallelized spring legs, wherein each middle stiffener wing from the first set of middle stiffener wings is bendable in an upward or a downward position relative to a planar surface of the middle section. The apparatus further includes a second set of middle stiffener wings of a second spring leg of the two parallelized spring legs, wherein each middle stiffener wing from the second set of middle stiffener wings is bendable in an upward or a downward position relative to the planar surface of the middle section.

Another aspect of an embodiment of the present discloses the apparatus further including a top section of the spring actuator is U-shaped and a first set of top stiffener wings of a first leg of the U-shaped top section, wherein each top stiffener wing from the first set of top stiffener wings is bendable in an upward or a downward position relative to a planar surface of the top section. The apparatus further includes a second set of top stiffener wings of a second leg of the U-shaped top section, wherein each top stiffener wing from the second set of top stiffener wings is bendable in an upward or a downward position relative to a planar surface of the top section.

Another aspect of an embodiment of the present discloses the apparatus further including a bottom section of the spring actuator is U-shaped. The apparatus further includes a first set of bottom stiffener wings of a first leg of the U-shaped bottom section, wherein each bottom stiffener wing from the first set of bottom stiffener wings is bendable in an upward or a downward position relative to a planar surface of the bottom section. The apparatus further includes a second set of bottom stiffener wings of a second leg of the U-shaped bottom section, wherein each bottom stiffener wing from the second set of bottom stiffener wings is bendable in an upward or a downward position relative to a planar surface of the bottom section.

Another aspect of an embodiment of the present discloses the apparatus further including the first leg and the second leg of the top section further define the gap formed the top section and two parallelized spring legs of the middle section of the spring actuator.

Another aspect of an embodiment of the present discloses the apparatus further including a plurality of flex cables of the cable head module are routable between the first leg and the second leg of the top section of the spring actuator.

Another aspect of an embodiment of the present discloses the apparatus further including a first stiffener bonded into a region of the first leg of the top section and a second stiffener bonded into a region of the second leg of the top section.

Another aspect of an embodiment of the present discloses the apparatus further including a third stiffener bonded into a region of the first leg of the bottom section and a fourth stiffener bonded into a region of the second leg of the bottom section.

Another aspect of an embodiment of the present discloses the apparatus further including the first stiffener, the second stiffener, the third stiffener, and the fourth stiffener are bonded with a viscoelastic adhesive.

Another aspect of an embodiment of the present discloses the apparatus further including the top portion includes at least one through hole for securing the top portion of the spring actuator and the bottom portion includes at least one through hole for securing the bottom portion of the spring actuator.

Another aspect of an embodiment of the present discloses the apparatus further including the two parallelized spring legs of the middle section of the spring actuator are skewed at an angle greater than zero.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

Figure 1:
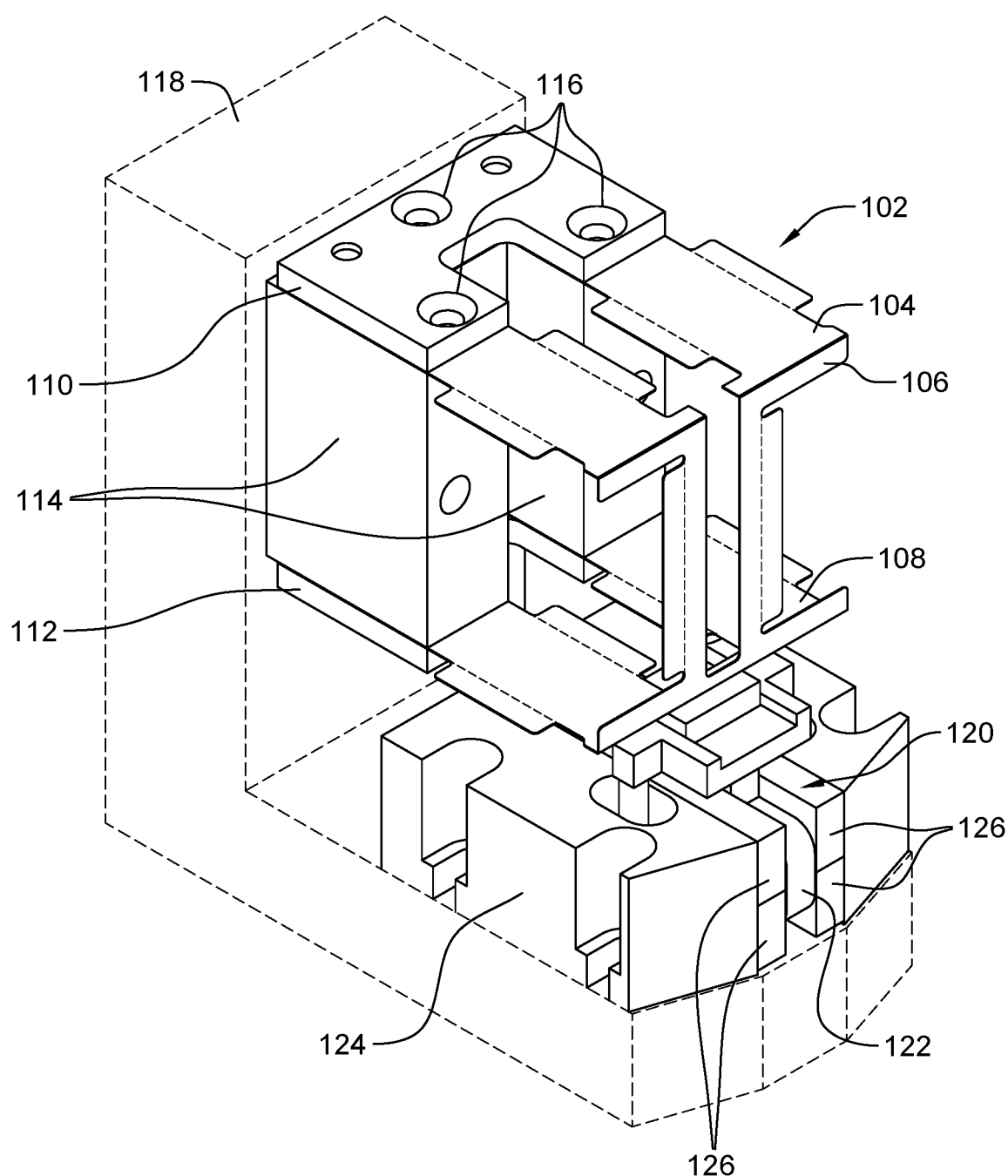
FIG. 1 depicts a three-dimensional view of a spring actuator compatible with a zero-degree head rotation positioned on a folded spring actuator assembly, in accordance with an embodiment of the present invention.

It will be appreciated that for simplicity and clarity purpose, elements shown in the drawings have not necessarily been drawn to scale. Further, and if applicable, in various functional block diagrams, two connected devices and/or elements may not necessarily be illustrated as being connected. In some other instances, grouping of certain elements in a functional block diagram may be solely for the purpose of description and may not necessarily imply that they are in a single physical entity, or they are embodied in a single physical entity.

DETAILED DESCRIPTION

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

Moreover, although various reference numerals may be used across different drawings, the same or similar reference numbers are used throughout the drawings to denote the same or similar features, elements, or structures, and thus detailed explanations of the same or similar features, elements, or structures may not be repeated for each of the drawings for economy of description. Labelling for the same or similar elements in some drawings may be omitted as well in order not to overcrowd the drawings.

Embodiments of the present invention provide a spring actuator for a new tape track following actor that reduces the moving mass of the spring actuator and increases the stiffness relative to flexible modes. A design of the spring actuator also reduces a total mass of the track following actuator with results in a reduction in the moving mass of the skew following actuator. An improvement includes increased track following and skew following bandwidth, resulting in an increase of track and skew following performance, and enabling track density and capacity increases. Portions of the spring actuator can include two steel springs with molded plastic stiffeners, two screws, 1 aluminum spring clamp, 1 aluminum beam with 2 tapped holes, 1 aluminum base plate (mass≈1.91 g) replaced with 1 folded spring (mass≈0.34 g). The total moving mass of the spring actuator includes the head, coil, and coil holder, and is ≈3.63 g. A total moving mass of the spring actuator discussed herein is ≈2.045 g and can further be reduced to ≈1.909 g if the same magnesium (Mg) alloy is utilized for the coil holder, thus resulting in a ~48% reduction in total moving mass. For skew following and tape dimensional stability (TDS) compensation, the entire track follow actuator is displaced by the skew actuator. Therefore, reducing the mass of the entire actuator enables improved skew servo bandwidth and skew servo performance. The total mass of the skew spring actuator is ≈49.35 g.

FIG. 1 depicts a three-dimensional view of a spring actuator compatible with a zero-degree head rotation positioned on a folded spring actuator assembly, in accordance with an embodiment of the present invention. Spring actuator 102 includes top section 104, middle section 106, and bottom section 108, where spring actuator 102 is folded into a C-shape and includes a zero-degree offset between top section 104 and bottom section 108. Spring actuator 102 is installed on an actuator assembly that includes top plate 110, bottom plate 112, and middle block 114, where a cable head module is not disposed in spring actuator 102 for illustrative purposes. A portion of top section 104 of spring actuator 102 is disposed between a bottom surface of top plate 110 and a top surface of middle block 114. A portion of bottom section 108 of spring actuator 102 is disposed between a top surface of bottom plate 112 and a bottom surface of middle block 114. Top plate 110 and bottom plate 112 each have a U-shaped cut out for placement of the cable head module when disposed in a cavity of top section 104, middle section 106, and bottom section 108, of spring actuator 102.

In this embodiment, top plate 110 includes three holes 116 for placement of three fasteners (e.g., screw, bolt) to secure the portion of top section 104 of spring actuator 102 between top plate 110 and the middle block 114, where each of the three fasteners pass through a respective through hole of top section 104 of spring actuator 102. The three holes 116 of top plate 110 are countersunk, where a tapered fastener is disposed in each of the three holes 116 (not illustrated in FIG. 1) and a top head portion of each tapered fastener is on a similar planar surface as a top surface of top plate 110. The respective through holes of top section 104 of spring actuator 102 are discussed in further detail with regards to FIG.

3. In other embodiments, a number of holes 116 and a placement of holes 116 can vary depending on the mounting requirements for spring actuator 102.

In this embodiment, bottom plate 112 includes three holes (not visible in FIG. 1) for placement of three fasteners to secure the portion of bottom section 108 of spring actuator 102 between bottom plate 112 and the middle block 114, where each of the three fasteners pass through a respective through hole of bottom section 108 of spring actuator 102. The three holes of bottom plate 112 are countersunk, where a tapered fastener is disposed in each of the three holes (not illustrated in FIG. 1) and a top head portion of each tapered fastener is on a similar planar surface as a bottom surface of bottom plate 112.

Figure 3:
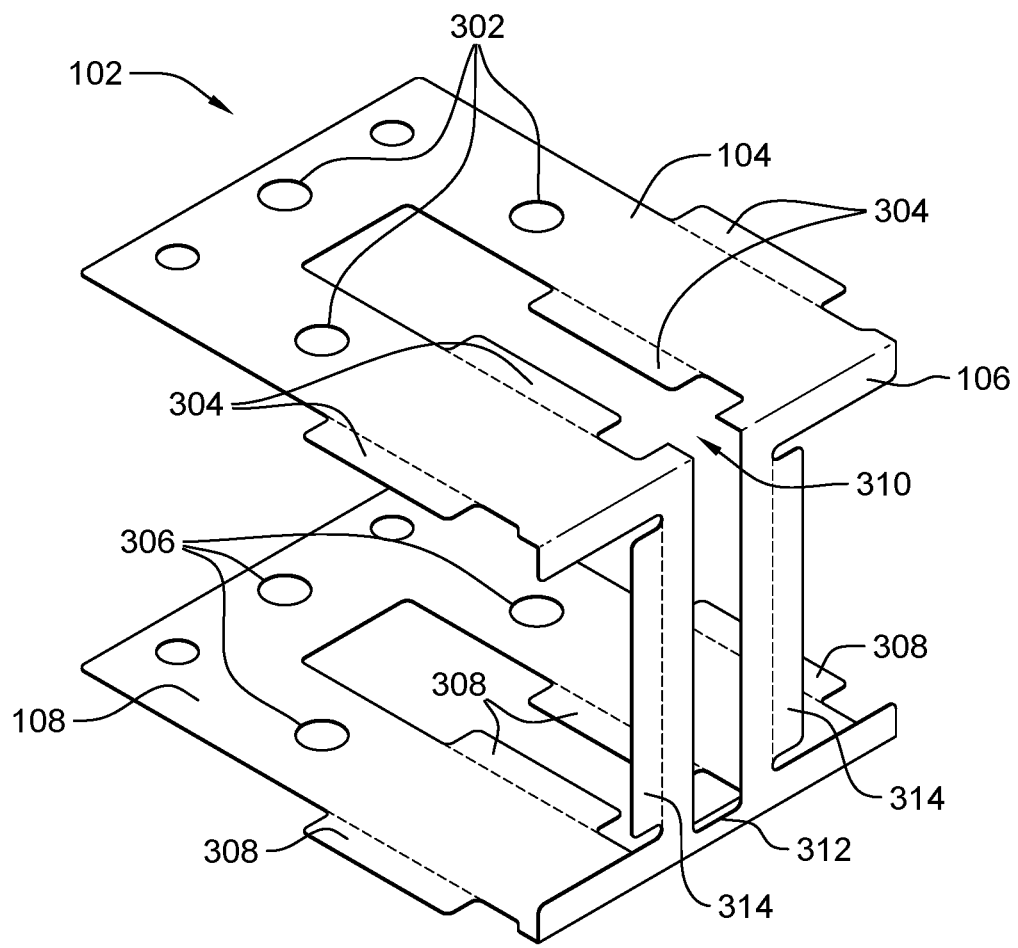
FIG. 3 depicts a three-dimensional view of a spring actuator compatible with a zero-degree head rotation removed from a folded spring actuator assembly, in accordance with an embodiment of the present invention.

The respective through holes of bottom section 108 of spring actuator 102 are discussed in further detail with regards to FIG. 3. In other embodiments, similar to holes 116 of top section 104 of spring actuator 102, a number of holes in bottom plate 112 and a placement of the holes in bottom plate 112 can vary depending on the mounting requirements for spring actuator 102. Middle block 114 is mounted on fixture 118 for illustrative purposes and do not represent a portion of a tape drive assembly to which the middle block 114 of the actuator assembly are mounted. Middle block 114 includes through holes for placement of a fastener for mounting the actuator assembly with respect to the tape drive assembly.

As previously mentioned, for illustrative purposes a cable head module is not disposed in a cable slot of spring actuator 102. Coil assembly 120 with voice coil 122 is positioned between base 124 that includes magnets 126 positioned on opposite sides of voice coil 122, where base 124 is attachable to the tape drive assembly or integrated into the tape drive assembly. Coil assembly 120 is positioned beneath bottom section 108 of spring actuator 102.

Figure 2:
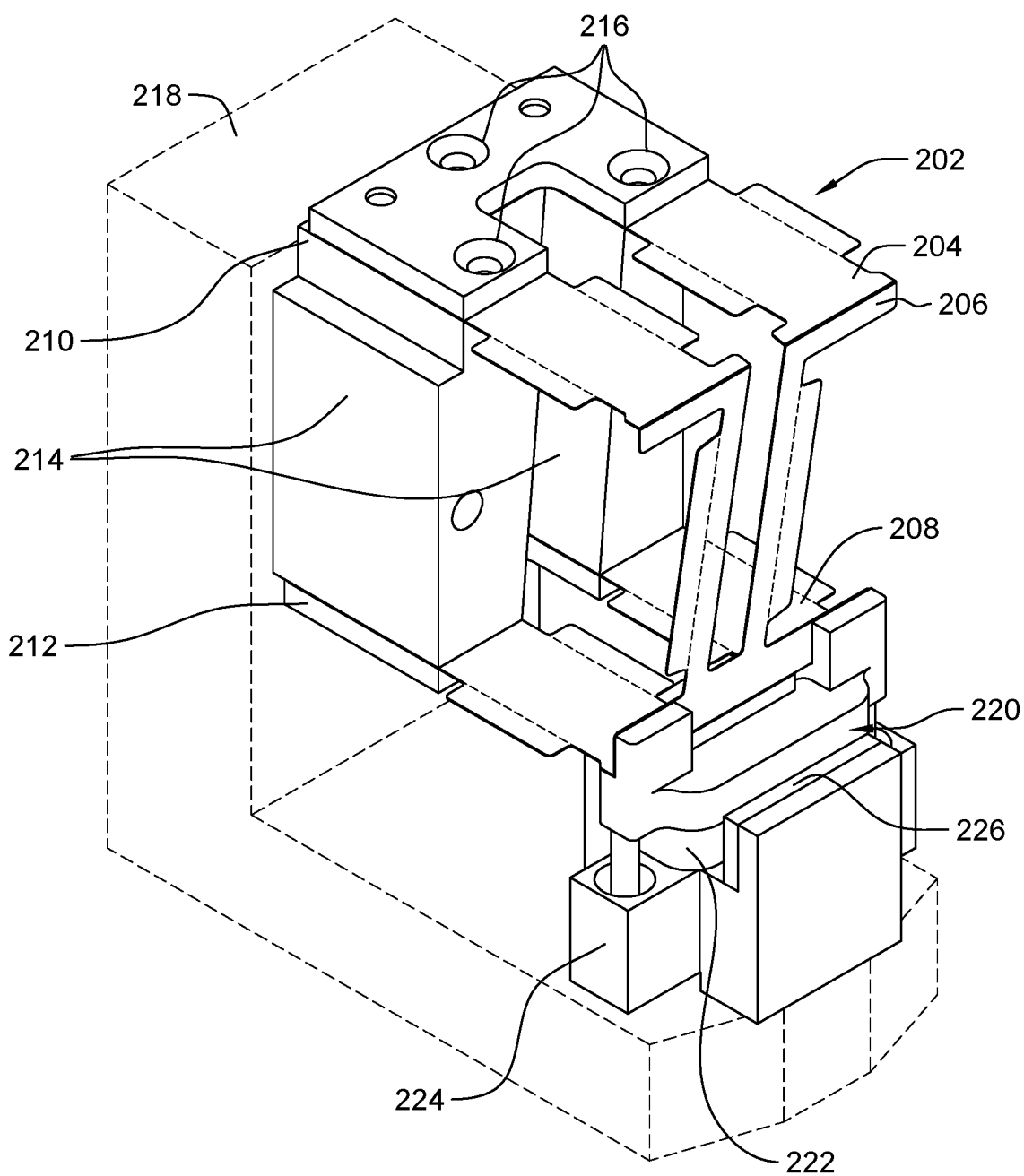
FIG. 2 depicts a three-dimensional view of a spring actuator compatible with a ten-degree head rotation positioned on a folded spring actuator assembly, in accordance with an embodiment of the present invention.

FIG. 2 depicts a three-dimensional view of a spring actuator compatible with a ten-degree head rotation positioned on a folded spring actuator assembly, in accordance with an embodiment of the present invention. Spring actuator 202 includes top section 204, middle section 206, and bottom section 208, where spring actuator 202 is folded into a C-shape and includes a ten-degree offset between top section 204 and bottom section 208. Spring actuator 202 is installed on an actuator assembly that includes top plate 210, bottom plate 212, and middle block 214, where a cable head module is not disposed in spring actuator 202 for illustrative purposes. In this embodiment, the middle block 214 are of different shapes, wherein a cavity between the two middle bocks is at the same ten-degree offset as top section 204 and bottom section 208 of spring actuator 202. A portion of top section 204 of spring actuator 202 is disposed between a bottom surface of top plate 210 and a top surface of middle block 214. A portion of bottom section 208 of spring actuator 202 is disposed between a top surface of bottom plate 212 and a bottom surface of middle block 214. Top plate 210 and bottom plate 212 each have a U-shaped cut out for placement of the cable head module when disposed in a cavity of top section 204, middle section 206, and bottom section 208, of spring actuator 202.

In this embodiment, top plate 210 includes three holes 216 for placement of three fasteners to secure the portion of top section 204 of spring actuator 202 between top plate 110 and the middle block 214, where each of the three fasteners pass through a respective through hole of top section 204 of spring actuator 202. The three holes 216 of top plate 210 are countersunk, where a tapered fastener is disposed in each of the three holes 216 (not illustrated in FIG. 2) and a top head portion of each tapered fastener is on a similar planar surface as a top surface of top plate 210. The respective through holes of top section 204 of spring actuator 202 are discussed in further detail with regards to FIG. 6. In other embodiments, a number of holes 216 and a placement of holes 216 can vary depending on the mounting requirements for spring actuator 202.

In this embodiment, bottom plate 212 includes three holes (not visible in FIG. 2) for placement of three fasteners to secure the portion of bottom section 208 of spring actuator 202 between bottom plate 212 and the middle block 214, where each of the three fasteners pass through a respective through hole of bottom section 208 of spring actuator 202. The three holes of bottom plate 212 are countersunk, where a tapered fastener is disposed in each of the three holes (not illustrated in FIG. 2) and a top head portion of each tapered fastener is on a similar planar surface as a bottom surface of bottom plate 212.

Figure 6:
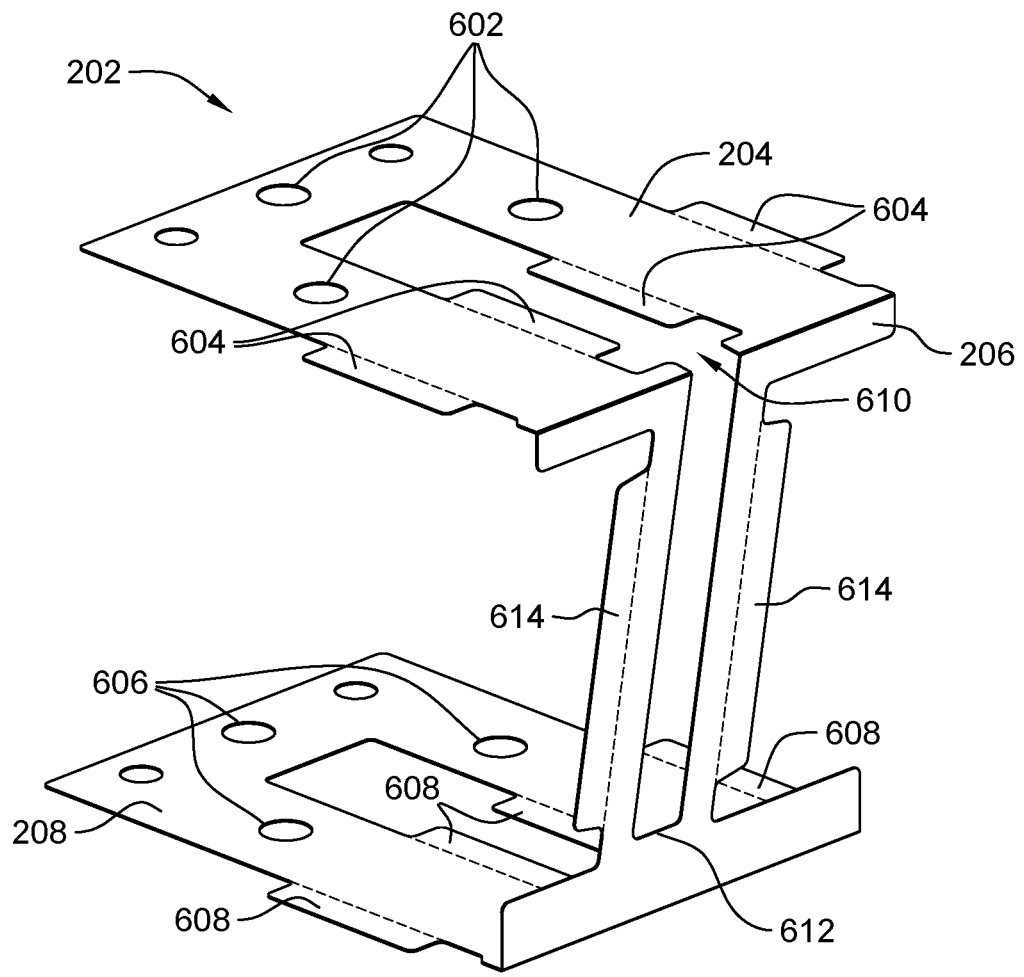
FIG. 6 depicts a three-dimensional view of a spring actuator compatible with a ten-degree head rotation removed from a folded spring actuator assembly, in accordance with an embodiment of the present invention.

The respective through holes of bottom section 208 of spring actuator 202 are discussed in further detail with regards to FIG. 6. In other embodiments, similar to holes 216 of top section 204 of spring actuator 202, a number of holes in bottom plate 212 and a placement of the holes in bottom plate 212 can vary depending on the mounting requirements for spring actuator 202. Middle block 214 is mounted on fixture 218 for illustrative purposes and do not represent a portion of a tape drive assembly to which the middle block 214 of the actuator assembly are mounted. Middle block 214 includes through holes for placement of a fastener for mounting the actuator assembly with respect to the tape drive assembly.

As previously mentioned, for illustrative purposes a cable head module is not disposed in a cable slot of spring actuator 202. Coil assembly 220 with voice coil 222 is positioned between base 224 that includes magnet 226 positioned on one side of voice coil 222 and additional magnets (not illustrated in FIG. 2) positioned on another side of voice coil 222 opposite magnet 226. Base 224 is attachable to the tape drive assembly or integrated into the tape drive assembly. Coil assembly 220 is positioned beneath bottom section 208 of spring actuator 202.

FIG. 3 depicts a three-dimensional view of a spring actuator compatible with a zero-degree head rotation removed from a folded spring actuator assembly, in accordance with an embodiment of the present invention. As previously discussed with regards to FIG. 1, spring actuator 102 includes top section 104, middle section 106, and bottom section 108, where spring actuator 102 is folded and includes a zero-degree offset between top section 104 and bottom section 108. In this embodiment, top section 104 is bent at a 90-degree angle relative to middle section 106 and bottom section 108 is bent at a 90-degree relative to middle section 106. Spring actuator 102 is removed from an actuator assembly, exposing the portion of top section 104 of spring actuator 102 that is placeable between top plate 110 and the middle block 114 (not illustrated in FIG. 3), and exposing the portion of bottom section 108 of spring actuator 102 that is displaceable between bottom plate 112 and the middle block 114. Top section 104 includes three top through holes 302 for placement of three fasteners when securing top section 104 between top plate 110 and the middle block 114. Top section 104 of spring actuator 102 also includes top stiffener wings 304 on each leg of U-shaped top section 104, where each of top stiffener wings 304 provides additional rigidity for each corresponding leg of the U-shaped top section 104. In this example, each of top stiffener wings 304 is not bent and at a zero-degree position relative to a planar surface of top section 104. Each of top stiffener wings 304 is bendable in an upward position (e.g., 45 degrees) or a downward position (e.g., −45 degrees) relative to the planar surface of top section 104, where an angle of each of top stiffener wings 304 can vary depending on application.

Bottom section 108 includes three bottom through holes 306 for placement of three fasteners when securing bottom section 108 between bottom plate 112 and the middle block 114. Bottom section 108 of spring actuator 102 also includes bottom stiffener wings 308 on each leg of U-shaped bottom section 108, where each of bottom stiffener wings 308 provides additional rigidity for each corresponding leg of the U-shaped bottom section 108. In this example, each of bottom stiffener wings 308 is not bent and at a zero-degree position relative to a planar surface of bottom section 108. Each of bottom stiffener wings 308 is bendable in an upward position (e.g., 45 degrees) or a downward position (e.g., −45 degrees) relative to the planar surface of bottom section 108, where an angle of each of bottom stiffener wings 308 can vary depending on application.

Middle section 106 of spring actuator 102 is I-beam shaped, where gap 310 is located at a top portion of middle section 108 to allow for placement of a cabled head module (not illustrated in FIG. 3). The cable head module is slidable down into gap 310 of top section 104 and middle section 106 of spring actuator 102, where the cable head module is glued to middle section 106 between middle stiffener wings 314 utilizing an adhesive. Bottom support 312 of middle section 106 is located below gap 310. A middle portion of middle section 106 includes middle stiffener wings 314 on each zero-degree skewed parallelized spring leg of I-beam shaped middle section 106, where each of middle stiffener wings 314 provides additional rigidity for each corresponding leg of the I-beam shaped middle section 106. In this example, each of middle stiffener wings 314 is not bent and at a zero-degree position relative to a planar surface of middle section 106. Each of middle stiffener wings 314 is bendable in an upward position (e.g., 45 degrees) or a downward position (e.g., −45 degrees) relative to the planar surface of middle section 106, where an angle of each of middle stiffener wings 314 can vary depending on application.

Figure 4:
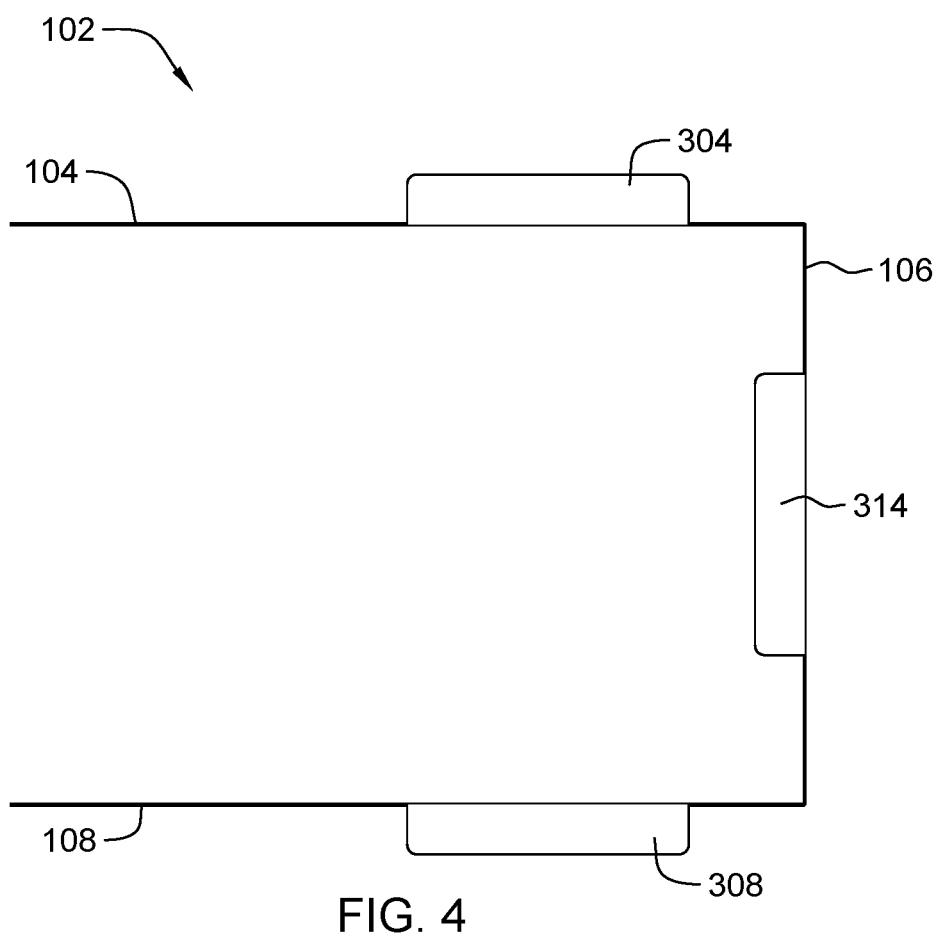
FIG. 4 depicts a side view of a spring actuator compatible with a zero-degree head rotation and with folded stiffening wings, in accordance with an embodiment of the present invention.

FIG. 4 depicts a side view of a spring actuator compatible with a zero-degree head rotation and with folded stiffening wings, in accordance with an embodiment of the present invention. In this embodiment, top section 104 of spring actuator 102 includes folded top stiffener wings 304, where each of top stiffener wings 304 is folded in an upward position (e.g., 50 degrees) relative to the planar surface of top section 104. The upward position of top stiffener wings 304 can also be referred to as an outward position relative to the C-shape of spring actuator 102. Bottom section 108 of spring actuator 102 includes folded bottom stiffener wings 308, where each of top stiffener wings 304 is folded in a downward position (e.g., 50 degrees) relative to the planar surface of bottom section 108. The upward position of bottom stiffener wings 308 can also be referred to as an outward position relative to the C-shape of spring actuator 102. Middle section 106 of spring actuator 102 includes folded middle stiffener wings 314, where each of top stiffener wings 304 is folded in a downward position (e.g., 50 degrees) relative to the planar surface of middle section 108. The downward position of middle stiffener wings 314 can also be referred to as an inward position relative to the C-shape of spring actuator 102. Alternatively, each of top stiffener wings 304, bottom stiffener wings 308, and middle stiffener wings 314 can each be folded in a direction opposite than what is illustrated in FIG. 4. Therefore, top stiffener wings 304 and bottom stiffener wings 308 can be folded inward, and middle stiffener wings 314 can be folded outward.

Figure 5:
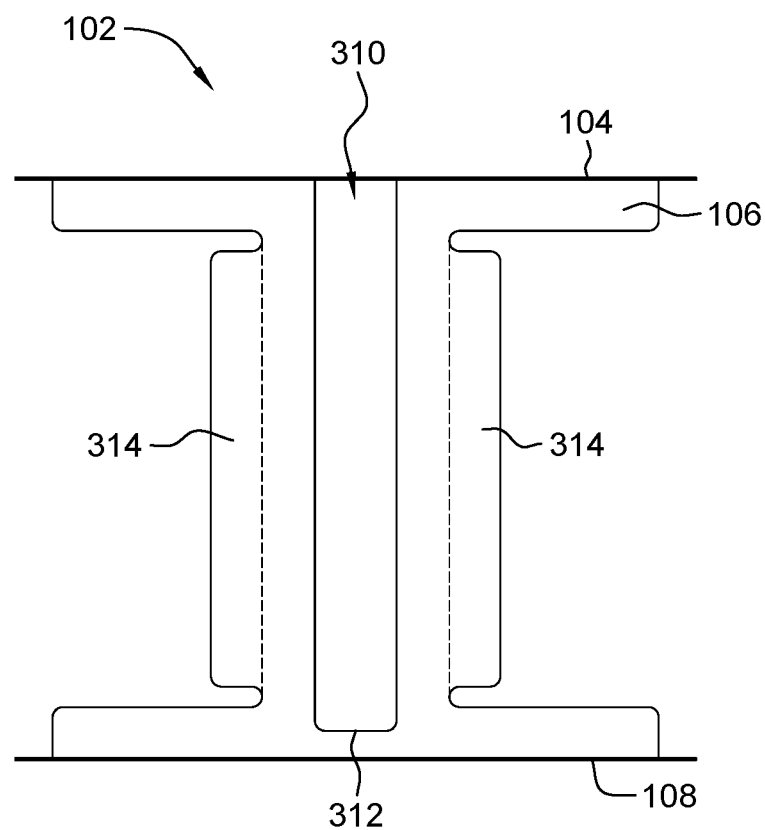
FIG. 5 depicts a front view of a spring actuator compatible with a zero-degree head rotation and with unfolded stiffening wings, in accordance with an embodiment of the present invention.

FIG. 5 depicts a front view of a spring actuator compatible with a zero-degree head rotation and with unfolded stiffening wings, in accordance with an embodiment of the present invention. In this front view of spring actuator 102, the I-beam shaped of middle section 106 is visible with gap 310 located at a top portion and bottom support 312 located at a bottom portion. As previously discussed, gap 310 of middle section 108 allows for placement of a cabled head module (not illustrated in FIG. 3) at a zero-degree angle, where the cable head module is slidable down into gap 310 of middle section 106 of spring actuator 102. A middle portion of middle section 106 includes middle stiffener wings 314 on each leg of I-beam shaped middle section 106, where each of middle stiffener wings 314 provides additional rigidity for each corresponding leg of the I-beam shaped middle section 106. In this example, each of middle stiffener wings 314 is not bent and at a zero-degree position relative to a planar surface of middle section 106.

FIG. 6 depicts a three-dimensional view of a spring actuator compatible with a ten-degree head rotation removed from a folded spring actuator assembly, in accordance with an embodiment of the present invention. As previously discussed with regards to FIG. 2, spring actuator 202 includes top section 204, middle section 206, and bottom section 208, where spring actuator 202 is folded and includes a ten-degree offset between top section 204 and bottom section 208. In this embodiment, top section 204 is bent at a 90-degree angle relative to middle section 206 and bottom section 208 is bent at a 90-degree relative to middle section 206. Spring actuator 202 is removed from an actuator assembly, exposing the portion of top section 204 of spring actuator 202 that is placeable between top plate 210 and the middle block 214 (not illustrated in FIG. 6), and exposing the portion of bottom section 208 of spring actuator 202 that is displaceable between bottom plate 212 and the middle block 214. Top section 204 includes three top through holes 602 for placement of three fasteners when securing top section 204 between top plate 210 and the middle block 214. Top section 204 of spring actuator 202 also includes top stiffener wings 604 on each leg of U-shaped top section 204, where each of top stiffener wings 604 provides additional rigidity for each corresponding leg of the U-shaped top section 204. In this example, each of top stiffener wings 604 is not bent and at a ten-degree position relative to a planar surface of top section 204. Each of top stiffener wings 604 is bendable in an upward position (e.g., 45 degrees) or a downward position (e.g., −45 degrees) relative to the planar surface of top section 204, where an angle of each of top stiffener wings 604 can vary depending on application.

Bottom section 208 includes three bottom through holes 606 for placement of three fasteners when securing bottom section 208 between bottom plate 212 and the middle block 214. Bottom section 208 of spring actuator 202 also includes bottom stiffener wings 608 on each leg of U-shaped bottom section 108, where each of bottom stiffener wings 608 provides additional rigidity for each corresponding leg of the U-shaped bottom section 208. In this example, each of bottom stiffener wings 608 is not bent and at a zero-degree position relative to a planar surface of bottom section 208. Each of bottom stiffener wings 608 is bendable in an upward position (e.g., 45 degrees) or a downward position (e.g., −45 degrees) relative to the planar surface of bottom section 208, where an angle of each of bottom stiffener wings 608 can vary depending on application.

Middle section 206 of spring actuator 202 is I-beam shaped, where gap 610 is located at a top portion of middle section 208 to allow for placement of a cabled head module (not illustrated in FIG. 6). The cable head module is slidable down into gap 610 of top section 204 and middle section 206 of spring actuator 202, where the cable head module is glued to middle section 206 between middle stiffener wings 614 utilizing an adhesive. Bottom support 612 of middle section 206 is located below gap 610. A middle portion of middle section 206 includes middle stiffener wings 614 on each ten-degree skewed parallelized spring leg of I-beam shaped middle section 206, where each of middle stiffener wings 614 provides additional rigidity for each corresponding leg of the I-beam shaped middle section 206. In this example, each of middle stiffener wings 614 is not bent and at a zero-degree position relative to a planar surface of middle section 206. Each of middle stiffener wings 614 is bendable in an upward position (e.g., 45 degrees) or a downward position (e.g., −45 degrees) relative to the planar surface of middle section 206, where an angle of each of middle stiffener wings 614 can vary depending on application. A degree of skew of the parallelized spring legs of the I-beam shaped middle section 206 is application dependent and can vary depending on the embodiment (five-degree, ten-degree etc.), where the degree of skew is greater than zero.

Figure 7:
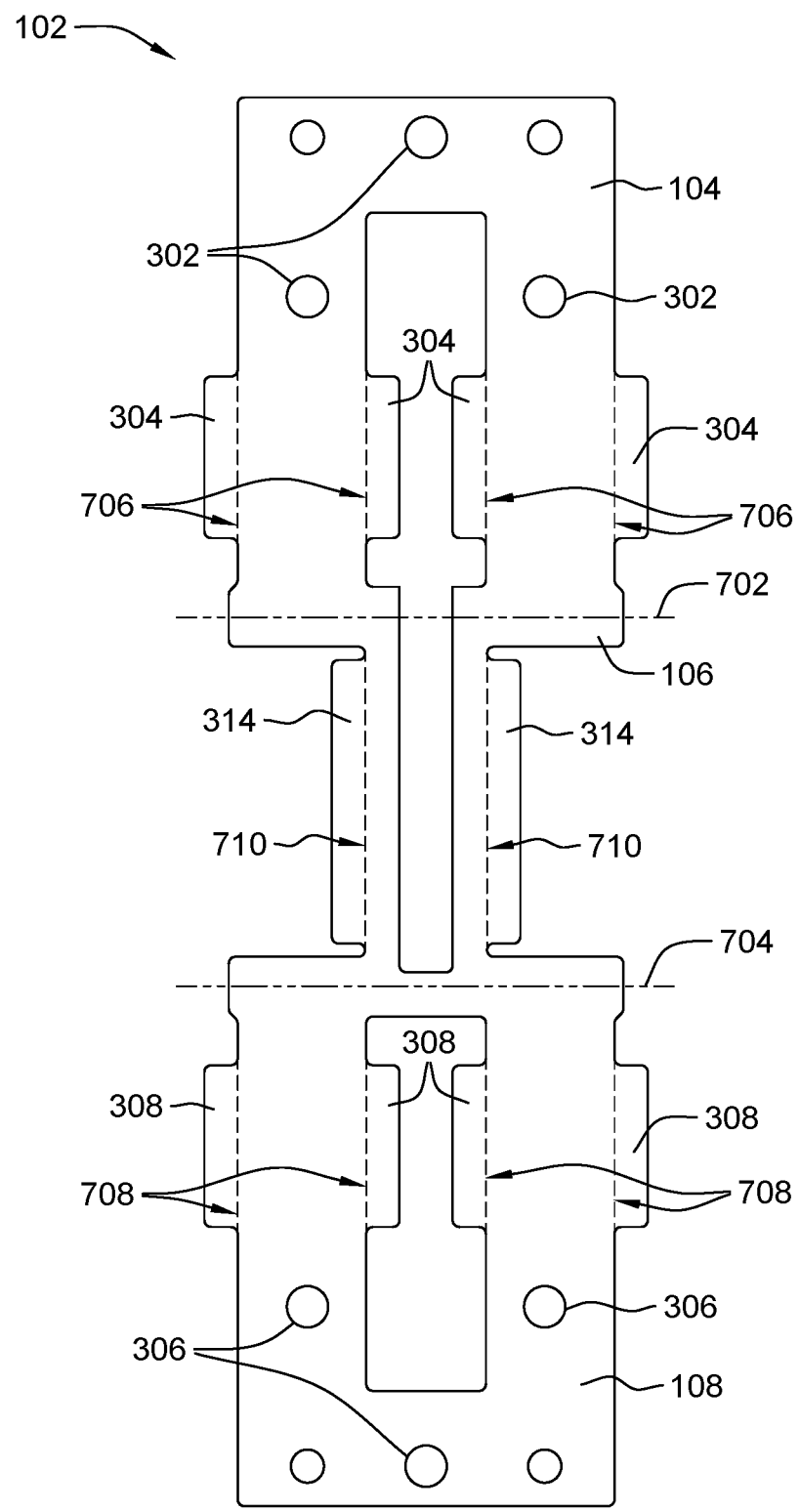
FIG. 7 depicts a top view of a spring actuator compatible with a zero-degree head rotation prior to folding, in accordance with an embodiment of the present invention.

FIG. 7 depicts a top view of a spring actuator compatible with a zero-degree head rotation prior to folding, in accordance with an embodiment of the present invention. Spring actuator 102 is fabricated by cutting (e.g., water, laser) a sheet (e.g., 50-70 um thick) of material (e.g., spring steel) and bending into a U-shape along first bend 702 and second bend 704. First bend 702 separates top section 104 from middle section 106 and second bend 704 separates middle section 106 from bottom section 108. During the fabrication process three top through holes 302 are cut into top section 104 and three bottom through holes 306 are cut into bottom section 108. For top stiffener wings 304, bottom stiffeners wings 308, and middle stiffener wings 314, during the manufacturing process indentations can be introduced into the material to allow for easier bending along top bend lines 706 for top stiffener wings 304, bottom bend lines 708 for bottom stiffener wings 308, and middle bend lines 710 for middle stiffener wings 314.

Figure 8:
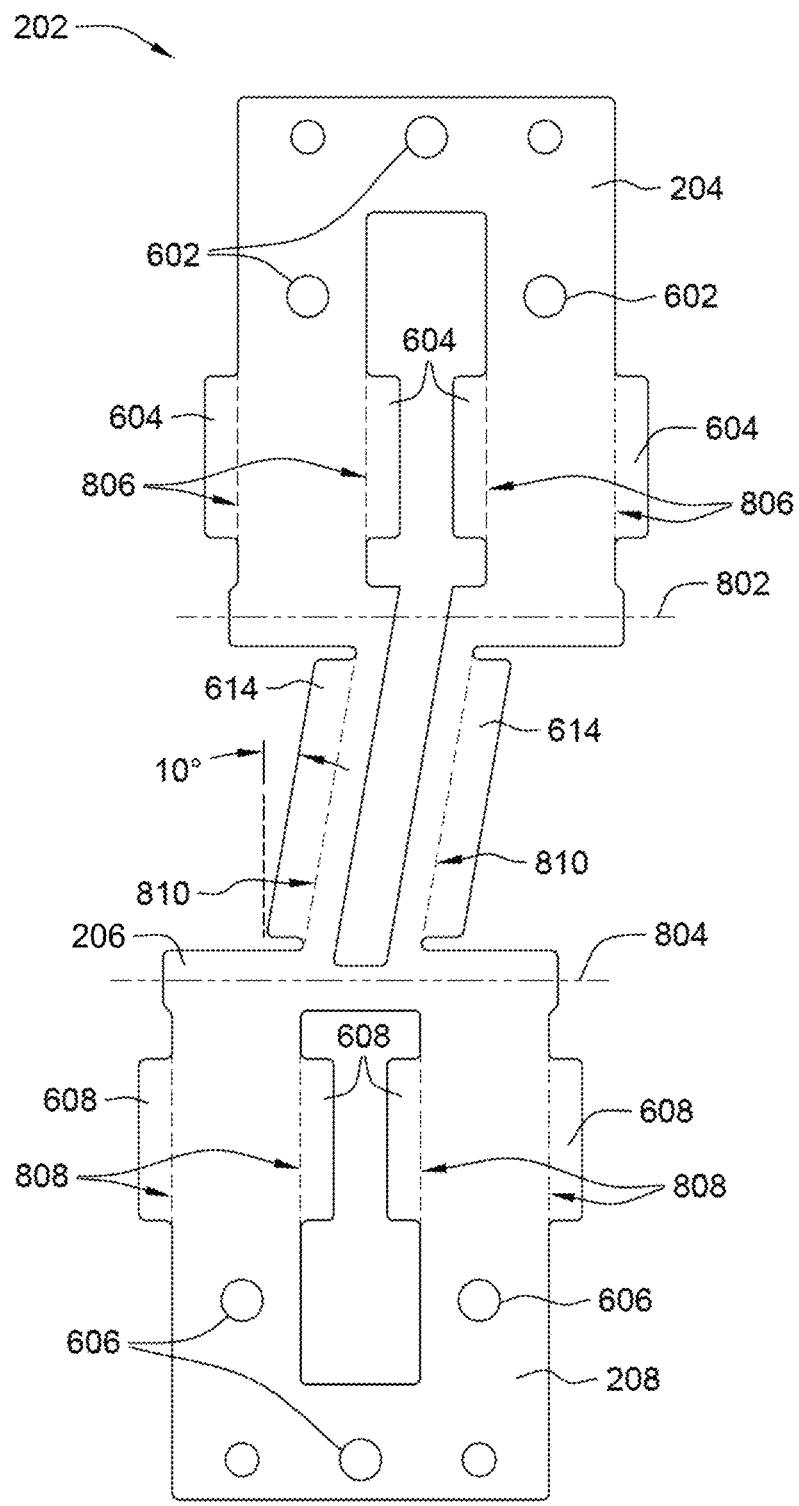
FIG. 8 depicts a top view of a spring actuator compatible with a ten-degree head rotation prior to folding, in accordance with an embodiment of the present invention.

FIG. 8 depicts a top view of a spring actuator compatible with a ten-degree head rotation prior to folding, in accordance with an embodiment of the present invention. Spring actuator 202 is fabricated by cutting a sheet of material and bending into a U-shape along first bend 802 and second bend 804. First bend 802 separates top section 204 from middle section 206 and second bend 804 separates middle section 206 from bottom section 208. During the fabrication process three top through holes 602 are cut into top section 204 and three bottom through holes 306 are cut into bottom section 208. For top stiffener wings 604, bottom stiffeners wings 608, and middle stiffener wings 614, during the manufacturing process indentations can be introduced into the material to allow for easier bending along top bend lines 806 for top stiffener wings 604, bottom bend lines 808 for bottom stiffener wings 608, and middle bend lines 810 for middle stiffener wings 614.

Figure 9:
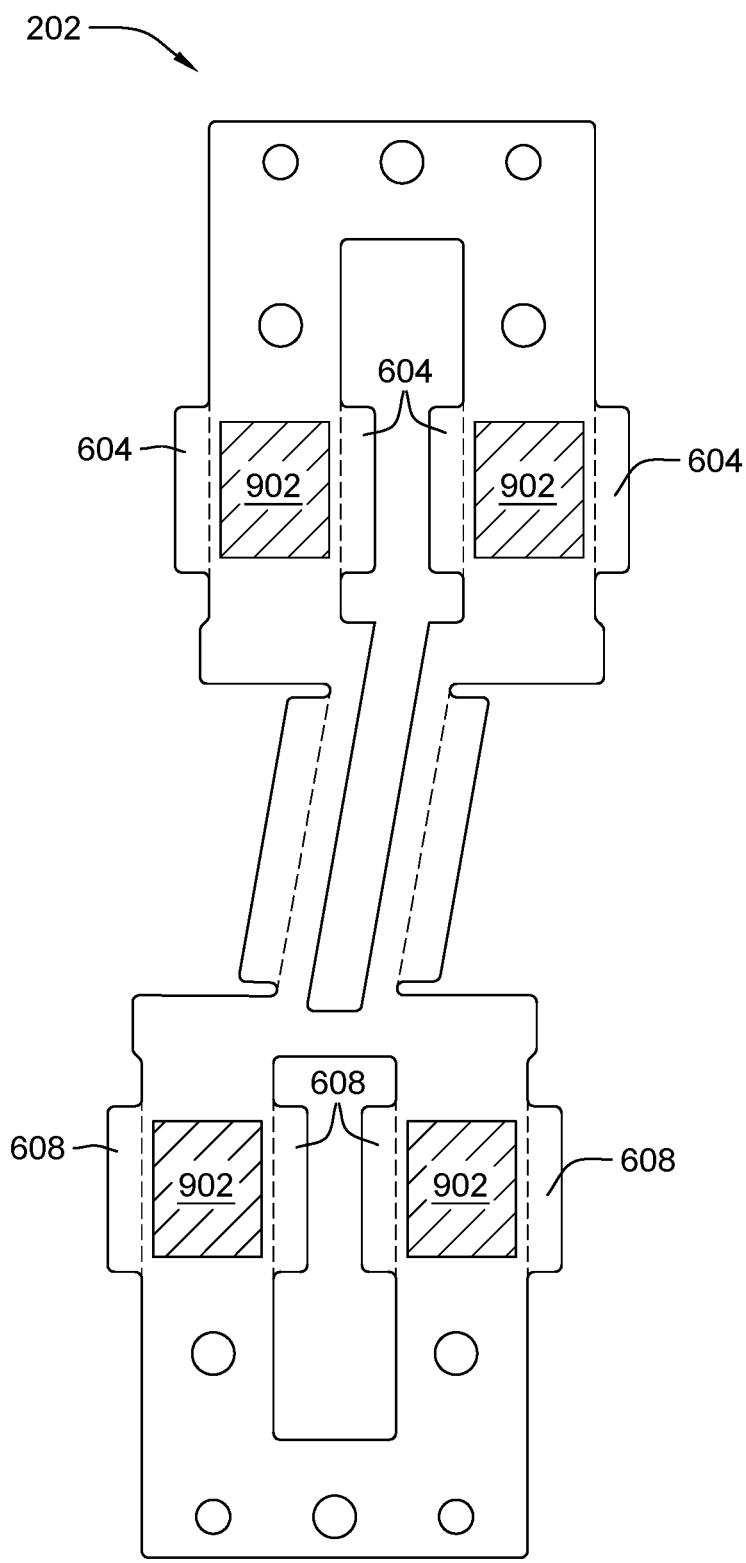
FIG. 9 depicts a top view of a spring actuator compatible with a ten-degree head rotation prior to folding and with additional stiffeners, in accordance with an embodiment of the present invention.

FIG. 9 depicts a top view of a spring actuator compatible with a ten-degree head rotation prior to folding and with additional stiffeners, in accordance with an embodiment of the present invention. In this embodiment, spring actuator 202 includes regions 902 where stiffeners are laminated into each leg of U-shaped top section 204 and into each leg of U-shaped bottom section 208. The stiffeners are of a stiff material, such as, steel and can be bonded to top section 204 and bottom section 208 with a viscoelastic adhesive to provide constrained layer damping to further improve the mechanical performance of spring actuator 202. An area of each of region 902 depends on a size of a stiffener being utilized and can vary depending on application. The two regions 902 of top section 204 are positioned between stiffener wings 604 and two regions 902 of bottom section 208 are positioned between stiffener wings 608. Similarly, spring actuator 102 can include regions 902 where stiffeners composed of a plastic material are laminated into each leg of U-shaped top section 104 and onto each leg of U-shaped bottom section 108.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of various embodiments of present invention have been presented for the purposes of illustration and they are not intended to be exhaustive and present invention are not limited to the embodiments disclosed. The terminology used herein was chosen to best explain the principles of the embodiments, practical application or technical improvement over technologies found in the marketplace, and to enable others of ordinary skill in the art to understand the embodiments disclosed herein. Many modifications, substitutions, changes, and equivalents will now occur to those of ordinary skill in the art. Such changes, modification, and/or alternative embodiments may be made without departing from the spirit of present invention and are hereby all contemplated and considered within the scope of present invention. It is, therefore, to be understood that the appended claims are intended to cover all such modifications and changes as fall within the spirit of the invention.

What is claimed is:

1. An apparatus for a spring actuator, the apparatus comprising:
   a top section, a middle section, and a bottom section of the spring actuator that form a C-shape for the spring actuator, wherein the middle section includes two parallelized spring legs; and
   a gap in the top section between the two parallelized spring legs of the middle section of the spring actuator, wherein a cable head module is slidable into the gap.

2. The apparatus of claim 1, further comprising:
   a first bend between the top section and the middle section; and
   a second bend between the bottom section and the middle section, wherein the first bend and the second bend form the C-shape for the spring actuator.

3. The apparatus of claim 2, further comprising:
   a first set of middle stiffener wings of a first spring leg of the two parallelized spring legs, wherein each middle stiffener wing from the first set of middle stiffener wings is bendable in an upward or a downward position relative to a planar surface of the middle section; and
   a second set of middle stiffener wings of a second spring leg of the two parallelized spring legs, wherein each middle stiffener wing from the second set of middle stiffener wings is bendable in an upward or a downward position relative to the planar surface of the middle section.

4. The apparatus of claim 3, further comprising:
the top section of the spring actuator is U-shaped;
a first set of top stiffener wings of a first leg of the top section, wherein each top stiffener wing from the first set of top stiffener wings is bendable in an upward or a downward position relative to a planar surface of the top section; and
a second set of top stiffener wings of a second leg of the top section, wherein each top stiffener wing from the second set of top stiffener wings is bendable in an upward or a downward position relative to a planar surface of the top section.

5. The apparatus of claim 4, further comprising:
the bottom section of the spring actuator is U-shaped;
a first set of bottom stiffener wings of a first leg of the bottom section, wherein each bottom stiffener wing from the first set of bottom stiffener wings is bendable in an upward or a downward position relative to a planar surface of the bottom section; and
a second set of bottom stiffener wings of a second leg of the bottom section, wherein each bottom stiffener wing from the second set of bottom stiffener wings is bendable in an upward or a downward position relative to a planar surface of the bottom section.

6. The apparatus of claim 5, wherein the first leg and the second leg of the top section further define the gap formed by the top section and the two parallelized spring legs of the middle section of the spring actuator.

7. The apparatus of claim 5, further comprising:
a first stiffener bonded into a region of the first leg of the top section; and
a second stiffener bonded into a region of the second leg of the top section.

8. The apparatus of claim 7, further comprising:
a third stiffener bonded into a region of the first leg of the bottom section; and
a fourth stiffener bonded into a region of the second leg of the bottom section.

9. The apparatus of claim 8, wherein the first stiffener, the second stiffener, the third stiffener, and the fourth stiffener are bonded with a viscoelastic adhesive.

10. The apparatus of claim 5, further comprising:
the top section includes at least one through hole for securing the top section of the spring actuator; and
the bottom section includes at least one through hole for securing the bottom section of the spring actuator.

11. The apparatus of claim 1, wherein the two parallelized spring legs of the middle section of the spring actuator are skewed at an angle greater than zero.

12. The apparatus of claim 11, further comprising:
a first bend between the top section and the middle section; and
a second bend between the bottom section and the middle section, wherein the first bend and the second bend form the C-shape for the spring actuator.

13. The apparatus of claim 12, further comprising:
a first set of middle stiffener wings of a first spring leg of the two parallelized spring legs, wherein each middle stiffener wing from the first set of middle stiffener wings is bendable in an upward or a downward position relative to a planar surface of the middle section; and
a second set of middle stiffener wings of a second spring leg of the two parallelized spring legs, wherein each middle stiffener wing from the second set of middle stiffener wings is bendable in an upward or a downward position relative to the planar surface of the middle section.

14. The apparatus of claim 13, further comprising:
the top section of the spring actuator is U-shaped;
a first set of top stiffener wings of a first leg of the top section, wherein each top stiffener wing from the first set of top stiffener wings is bendable in an upward or a downward position relative to a planar surface of the top section; and
a second set of top stiffener wings of a second leg of the top section, wherein each top stiffener wing from the second set of top stiffener wings is bendable in an upward or a downward position relative to a planar surface of the top section.

15. The apparatus of claim 14, further comprising:
the bottom section of the spring actuator is U-shaped;
a first set of bottom stiffener wings of a first leg of the bottom section, wherein each bottom stiffener wing from the first set of bottom stiffener wings is bendable in an upward or a downward position relative to a planar surface of the bottom section; and
a second set of bottom stiffener wings of a second leg of the bottom section, wherein each bottom stiffener wing from the second set of bottom stiffener wings is bendable in an upward or a downward position relative to a planar surface of the bottom section.

16. The apparatus of claim 15, wherein the first leg of the top section and the second leg of the top section further define the gap formed by the top section and the two parallelized spring legs of the middle section of the spring actuator.

17. The apparatus of claim 15, further comprising:
a first stiffener bonded into a region of the first leg of the top section; and
a second stiffener bonded into a region of the second leg of the top section.

18. The apparatus of claim 17, further comprising:
a third stiffener bonded into a region of the first leg of the bottom section; and
a fourth stiffener bonded into a region of the second leg of the bottom section, wherein the first stiffener, the second stiffener, the third stiffener, and the fourth stiffener are bonded with a viscoelastic adhesive.

\* \* \* \* \*